(12) United States Patent
Maeng et al.

(10) Patent No.: US 12,067,600 B2
(45) Date of Patent: Aug. 20, 2024

(54) AVAILABLE CAPACITY-BASED BILLING SYSTEM AND METHOD FOR VEHICLE BATTERIES

(71) Applicants: HYUNDAI MOTOR COMPANY, Seoul (KR); KIA CORPORATION, Seoul (KR)

(72) Inventors: Cheon Maeng, Yongin-si (KR); Hyun Soo Park, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 254 days.

(21) Appl. No.: 17/869,153

(22) Filed: Jul. 20, 2022

(65) Prior Publication Data

US 2023/0124067 A1 Apr. 20, 2023

(30) Foreign Application Priority Data

Oct. 19, 2021 (KR) .......................... 10-2021-0139433

(51) Int. Cl.
*G06Q 30/04* (2012.01)
*B60L 58/12* (2019.01)
*G06Q 50/06* (2024.01)

(52) U.S. Cl.
CPC .............. *G06Q 30/04* (2013.01); *B60L 58/12* (2019.02); *G06Q 50/06* (2013.01); *B60L 2240/70* (2013.01)

(58) Field of Classification Search
CPC ........ G06Q 30/04; G06Q 50/06; B60L 58/12; B60L 2240/70
See application file for complete search history.

(56) References Cited

U.S. PATENT DOCUMENTS

2019/0366874 A1* 12/2019 Bryngelsson ........... B60L 58/13

FOREIGN PATENT DOCUMENTS

| JP | 5316709 B2 | 10/2013 |
| JP | 6690420 B2 | 4/2020 |
| KR | 2013-0061964 A | 6/2013 |
| KR | 2018-0056091 A | 5/2018 |
| KR | 2019-0085554 A | 7/2019 |
| WO | 2011/155034 A1 | 12/2011 |

* cited by examiner

*Primary Examiner* — Paul Danneman
(74) *Attorney, Agent, or Firm* — MCDONNELL BOEHNEN HULBERT & BERGHOFF LLP

(57) ABSTRACT

An available capacity-based billing system includes a vehicle including a battery, and a battery controller configured to determine a maximum value and a minimum value of a state of charge (SOC) of the battery based on settings of an available capacity of the battery, a user terminal configured to receive a capacity setting change request including a setting change amount of the available capacity and then to transmit the capacity setting change request, and a server configured to receive the capacity setting change request transmitted by the user terminal and to determine a battery usage fee corresponding to the setting change amount of the available capacity included in the received capacity setting change request.

16 Claims, 5 Drawing Sheets

300km range · 60kwh/month

900km range · 180kwh/month

1500km range · 300kwh/month

AVAILABLE CAPACITY-BASED BILLING SYSTEM AND METHOD FOR VEHICLE BATTERIES

CROSS REFERENCE TO RELATED APPLICATIONS

This application claims priority from Korean Patent Application No. 10-2021-0139433, filed on Oct. 19, 2021, in the Korean Intellectual Property Office, the disclosure of which is incorporated herein by reference in its entirety.

BACKGROUND

1. Field

The present disclosure relates to an available capacity-based billing system and method for vehicle batteries, and more particularly, to an available capacity-based billing system and method for vehicle batteries which may enable a driver to change the available capacity of a battery configured to store energy supplied to a driving motor of an electric vehicle depending on driver settings, and may charge a usage fee based on the available capacity set by the driver himself or herself.

2. Description of the Related Art

Recently, as all fields of industry are becoming aware of environmental issues, such as restrictions on carbon emissions for prevention of global warming, research, development and commercialization of eco-friendly vehicles provided with a motor configured to generate rotational force using electrical energy are rapidly underway in the automobile industry, instead of conventional vehicles provided with an engine configured to generate contaminants, such as carbon oxides or nitrogen oxides, through combustion of fossil fuel.

Among eco-friendly vehicles, an electric vehicle is a vehicle in which a motor is driven only using electrical energy stored in a battery.

In such an electric vehicle, indexes related to performances, such as a distance to empty on one charge, may be determined depending on the specifications of a battery, and the capacity and performance of the battery are important in order to secure excellent indexes related to performances.

Further, the battery takes up a big portion of the price of the electric vehicle, and thus has a great influence not only on the performance of the vehicle but also on the price of the vehicle.

In conventional electric vehicles, batteries of having single specifications or batteries having two specifications are used to manufacture the electric vehicles. For example, a battery having a relatively low capacity is applied to an electric vehicle having general specifications, and a battery having a relatively higher capacity is applied to an electric vehicle having high-performance specifications.

According to the above conventional electric vehicle manufacturing method, although a driver hardly drives an electric vehicle long distances and does not require a high-capacity battery, the driver must purchase an electric vehicle having an unnecessary high-capacity battery expensively.

Further, when a driver purchased an electric vehicle provided with the conventional battery having a low-capacity but the driver frequently drives the electric vehicle long distances due to change in the purpose of use of the vehicle and thus requires a high-capacity battery, the driver additionally needs to purchase a new electric vehicle provided with a high-capacity battery, or has no choice but to use the existing electric vehicle while frequently charging the low-capacity battery.

The above information disclosed in the Background section is only for enhancement of understanding of the background of the disclosure and should not be interpreted as conventional technology that is already known to those skilled in the art.

SUMMARY

Therefore, the present disclosure has been made in view of the above problems, and it is an object of the present disclosure to provide an available capacity-based billing system and method for vehicle batteries which may enable a driver to change the available capacity of a battery in a vehicle after purchasing the vehicle and may charge the driver a usage fee based on the available capacity of the battery set by the driver himself or herself.

In accordance with an aspect of the present disclosure, the above and other objects can be accomplished by the provision of an available capacity-based billing system for vehicle batteries, including a vehicle including a battery and a battery controller configured to determine a maximum value and a minimum value of a state of charge (SOC) of the battery based on settings of an available capacity of the battery, a user terminal configured to receive a capacity setting change request including a setting change amount of the available capacity and then to transmit the capacity setting change request, and a server configured to receive the capacity setting change request transmitted by the user terminal and to determine a battery usage fee corresponding to the setting change amount of the available capacity included in the received capacity setting change request.

The battery controller may determine a changeable amount of the available capacity of the battery based on predetermined settings of the available capacity of the battery, and may transmit the determined changeable amount to the user terminal.

The user terminal may display the changeable amount, and may receive the setting change amount of the available capacity determined based on the changeable amount.

The server may transmit the battery usage fee corresponding to the setting change amount of the available capacity to the user terminal, and the user terminal may receive whether or not to accept the battery usage fee corresponding to the setting change amount of the available capacity, and may transmit whether or not to accept the battery usage fee to the server.

The server may calculate and charge the battery usage fee based on the settings of the available capacity of the battery and a usage period of the corresponding settings of the available capacity.

The battery controller may set a charge cut-off voltage corresponding to the maximum value of the SOC of the battery depending on the settings of the available capacity, and may set a discharge cut-off voltage corresponding to the minimum value of the SOC of the battery depending on the settings of the available capacity.

The battery controller may set a maximum value of an open-circuit voltage of the battery corresponding to the maximum value of the SOC of the battery depending on the settings of the available capacity, and may set a minimum value of the open-circuit voltage of the battery corresponding to the minimum value of the SOC of the battery depending on the settings of the available capacity.

The battery controller may determine the maximum value and the minimum value of the SOC of the battery as values symmetric to each other with respect to a reference value of the SOC of the battery.

In accordance with another aspect of the present disclosure, there is provided an available capacity-based billing method for vehicle batteries using the available capacity-based billing system, the available capacity-based billing method including receiving, by the user terminal, the capacity setting change request including the setting change amount of the available capacity and then transmitting the capacity setting change request, receiving, by the server, the capacity setting change request transmitted by the user terminal and determining the battery usage fee corresponding to the setting change amount of the available capacity included in the received capacity setting change request, and transmitting, by the server, the setting change amount of the available capacity to the vehicle after determining the battery usage fee, and changing, by the battery controller, the settings of the available capacity of the battery.

The available capacity-based billing method may further include determining, by the battery controller, a changeable amount of the available capacity of the battery based on predetermined settings of the available capacity of the battery, and transmitting the determined changeable amount to the user terminal, before the transmitting, by the user terminal, the capacity setting change request.

In the receiving, by the user terminal, the capacity setting change request including the setting change amount of the available capacity and then transmitting the capacity setting change request, the user terminal may display the changeable amount, and may receive the setting change amount of the available capacity determined based on the changeable amount.

The determining, by the server, the battery usage fee may include transmitting, by the server, the battery usage fee corresponding to the setting change amount of the available capacity to the user terminal, and receiving, by the user terminal, whether or not to accept the battery usage fee corresponding to the setting change amount of the available capacity and transmitting whether or not to accept the battery usage fee to the server.

The available capacity-based billing method may further include calculating and charging, by the server, the battery usage fee based on the settings of the available capacity of the battery and a usage period of the corresponding settings of the available capacity.

In the changing, by the battery controller, the settings of the available capacity of the battery, the battery controller may set a charge cut-off voltage corresponding to the maximum value of the SOC of the battery depending on the settings of the available capacity, and may set a discharge cut-off voltage corresponding to the minimum value of the SOC of the battery depending on the settings of the available capacity.

In the changing, by the battery controller, the settings of the available capacity of the battery, the battery controller may set a maximum value of an open-circuit voltage of the battery corresponding to the maximum value of the SOC of the battery depending on the settings of the available capacity, and may set a minimum value of the open-circuit voltage of the battery corresponding to the minimum value of the SOC of the battery depending on the settings of the available capacity.

In the changing, by the battery controller, the settings of the available capacity of the battery, the battery controller may determine the maximum value and the minimum value of the SOC of the battery as values symmetric to each other with respect to a reference value of the SOC of the battery.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Hereinafter, an available capacity-based billing system and method for vehicle batteries according to various embodiments of the present disclosure will be described with reference to the accompanying drawings.

Figure 1:
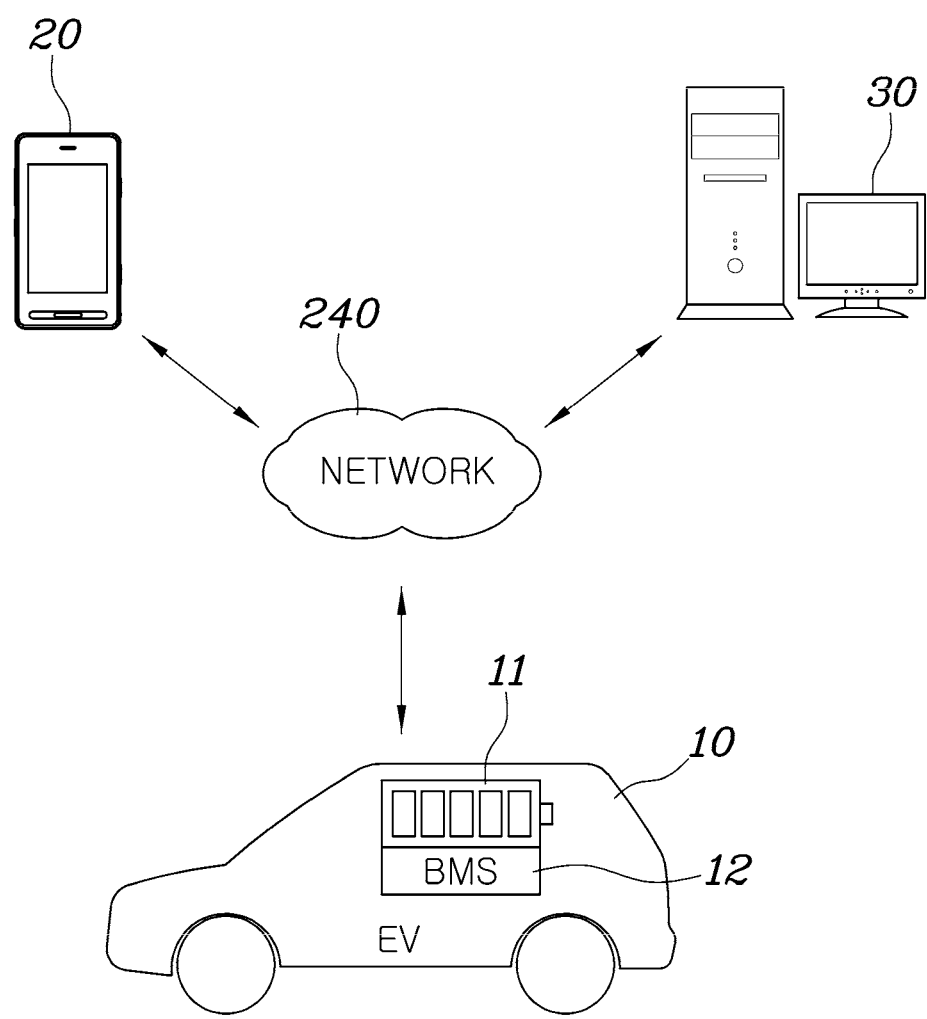
FIG. 1 is a block diagram of an available capacity-based billing system for vehicle batteries according to one embodiment of the present disclosure.

FIG. 1 is a block diagram of an available capacity-based billing system for vehicle batteries according to one embodiment of the present disclosure.

Referring to FIG. 1, the available capacity-based billing system for vehicle batteries according to one embodiment of the present disclosure may include a vehicle 10 including a battery 11 and a battery controller 12 configured to determine the maximum value and the minimum value of the state of charge (SOC) of the battery 11 based on settings of the available capacity of the battery 11, a user terminal 20 configured to receive a capacity setting change request including the setting change amount of the available capacity and then to transmit the capacity setting change request, and a server 30 configured to receive the capacity setting change request transmitted by the user terminal 20 and to determine a battery usage fee corresponding to the setting change amount of the available capacity included in the received capacity setting change request.

The vehicle 10 is an electric vehicle (EV) which generates driving force of wheels via a motor driven using energy stored in the battery 11, and may include the battery 11 configured to store energy for driving the motor, and the battery controller 12 configured to monitor the state of the battery 11 and to control charging and discharging of the battery 11.

The battery controller 12 may be implemented as a control device known as a battery management system (BMS) in the art. In various embodiments of the present disclosure, the battery controller 12 may set the available capacity of the battery 11, and may determine a SOC region of the battery 11 operated based on the set available capacity.

The user terminal 20 is a wireless terminal possessed by an owner of the vehicle 10 or a person in charge of driving the vehicle 10. In one embodiment of the present disclosure, the user terminal 20 may receive the capacity setting change request for the battery 11 input by the owner of the vehicle 10 or the person in charge of driving the vehicle 10, and may transmit the capacity setting change request to the server 30.

An application for management of the battery 11 may be installed in the user terminal 20. The user terminal 20 may receive a changeable amount of the available capacity of the battery in the vehicle 10 from the vehicle 10 and display the received changeable amount of the available capacity of the battery through the application. When the owner of the vehicle 10 or the person in charge of driving the vehicle 10 executes the application, determines the setting change amount of the available capacity of the battery based on the changeable amount of the available capacity of the battery displayed in the application, and then inputs the determined setting change amount of the available capacity of the battery, the capacity setting change request including the input setting change amount of the available capacity of the battery may be transmitted to the server 30.

The server 30 may receive the setting change amount of the available capacity included in the capacity setting change request transmitted by the user terminal 20, may determine the battery usage fee corresponding to the setting change amount of the available capacity, and may transmit the determined battery usage fee to the user terminal 20. When the owner of the vehicle 10 or the person in charge of driving the vehicle 10 confirms the battery usage fee through the user terminal 20 and then inputs whether or not to accept the corresponding fee to the user terminal 20, the user terminal 20 may transmit whether or not to accept the corresponding fee to the server 30, and the server 30 may confirm the battery usage fee depending on whether or not to accept the corresponding fee.

Further, the server 30 may calculate and charge the battery usage fee based on settings of the available capacity of the battery and the usage period of the corresponding settings of the available capacity.

The vehicle 10, the user terminal 20 and the server 30 may mutually communicate with each other through a communication network 240. That is, the vehicle may be a vehicle to which the concept of a connected car known in the art is applied.

FIGS. 2 to 5 are views illustrating examples of settings of the available capacity of the battery in the available capacity-based billing system for vehicle batteries according to one embodiment of the present disclosure.

Figure 2:
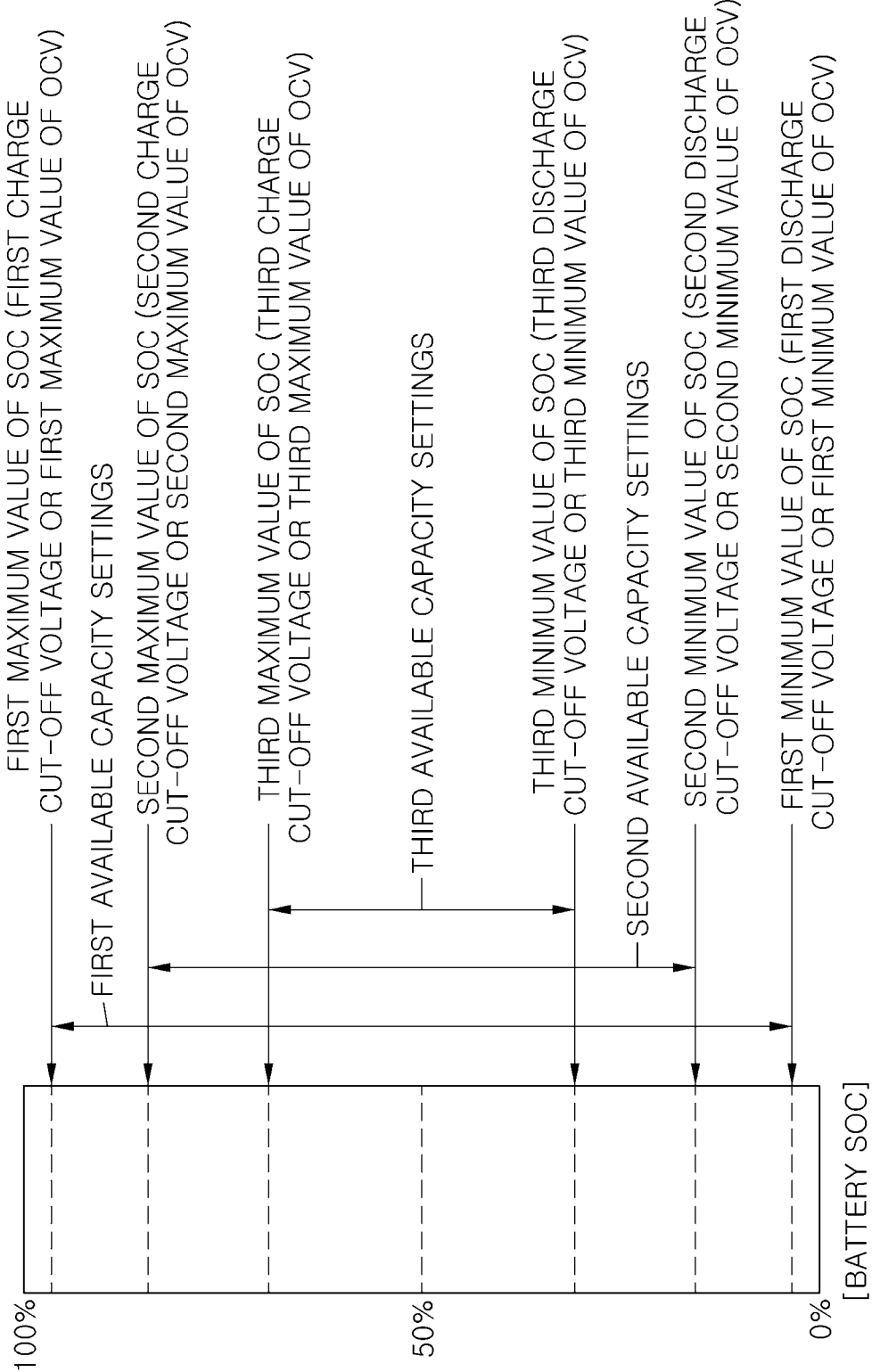
FIG. 2 is a view illustrating an example of settings of the available capacity of a battery in the available capacity-based billing system for vehicle batteries according to one embodiment of the present disclosure.

As shown in FIG. 2, in the available capacity-based billing system for vehicle batteries according to one embodiment of the present disclosure, various sections in which charging and discharging of the battery are performed may be determined by setting the minimum value and the maximum value of the entire SOC of the battery to various values.

As one example, a driver, who purchases the vehicle mainly for driving the vehicle short distances, may use as small a battery capacity as possible by applying third available capacity settings shown in FIG. 2, and may pay a relatively small battery usage fee corresponding to the smallest third available capacity settings so as to operate the vehicle.

As another example, a driver, who purchases the vehicle mainly for the purpose of driving the vehicle long distances, may use as large a battery capacity as possible by applying first available capacity settings shown in FIG. 2, and may pay a relatively large battery usage fee corresponding to the largest first available capacity settings so as to operate the vehicle.

The driver, who has purchased the vehicle, may change the settings of the available battery in a situation, such as in a case in which the purpose of use of the vehicle is changed while operating the vehicle or it is temporarily necessary to drive the vehicle long distances.

The change in the settings of the available capacity or the change in the battery usage fee thereby may be variously adjusted as needed.

As one example, in order to temporarily increase the available capacity of the battery, the battery usage fee may be set depending on an increase in the available capacity on a daily basis. As another example, in order to increase the available capacity of the battery for a relatively long time, the battery usage fee may be set depending on an increase in the available capacity on a weekly basis, on a monthly basis, or without any time limit.

As such, in one embodiment of the present disclosure, a similar concept to a fee corresponding to data usage of a mobile communication service may be applied to the available capacity of the battery. That is, similarly to the mobile communication service to which various fee systems are applied depending on data usage, in one embodiment of the present disclosure, various fee systems may be set in advance depending on the available capacities of the battery of the vehicle and, in a case in which the available capacity of the battery of the vehicle needs to be changed, various methods for changing the available capacity of the battery so as to suit driver needs, such as change of the fee system itself, temporary payment of an additional fee, etc., may be used.

Further, in various embodiments of the present disclosure, application of the set available capacity of the battery 11 may be performed through monitoring of the battery 11 and control of charging and discharging of the battery by the battery controller 12.

The battery controller 12 may suitably determine the maximum value and the minimum value of the state of charge (SOC) of the battery 11 based on the set available capacity, so as to operate the battery 11 within the range of the set available capacity.

For example, the battery controller 12 may control charging and discharging of the battery 11 by changing a charge cut-off voltage and a discharge cut-off voltage depending on the set available capacity. The charge cut-off voltage and the discharge cut-off voltage mean a voltage at which charge of the battery 11 is terminated and a voltage at which discharge of the battery 11 is terminated, and the charge cut-off voltage is increased and the discharge cut-off voltage is decreased as the set available capacity of the battery 11 is increased (with reference to FIG. 2). The reason for this is that the SOC of the battery 11 and the voltage of the battery 11 show almost proportional relationships. That is, the voltage of the battery 11 is increased as the SOC of the battery 11 is increased, and the voltage of the battery 11 is decreased as the SOC of the battery 11 is decreased.

Figure 5:
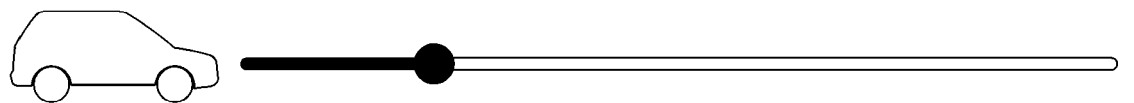
FIG. 5 is a view illustrating another example of settings of the available capacity of the battery in the available capacity-based billing system for vehicle batteries according to one embodiment of the present disclosure.
Figure 5:
Figure 5:

FIG. 5 is a view illustrating another example of settings of the available capacity of the battery in the available capacity-based billing system for vehicle batteries according to one embodiment of the present disclosure, and a user may intuitively set the available capacity of the battery 11 by operating a user interface (UI) shown in FIG. 5 through the user terminal 20, such as a smartphone or a tablet computer. The user may set a desired driving range through scrolling or dragging, as shown in this figure and, in this case, a fee automatically calculated depending on the set driving range may be output through a display so as to increase intuition in usage. On the contrary, when a payable fee range is scrolled or dragged, a driving range corresponding to the fee range may be calculated and displayed.

In such a method using the UI, when values, which are set in advance, are not selected, as shown in FIG. 2, the user may select a desired value in detail and a result of selection may be displayed in real time, thereby increasing user convenience.

Further, such use of the UI in the user terminal 20 matches the concept of conversion of the battery 11, i.e., a tangible product, into an intangible service, which is the object of the present disclosure, and provides intuition so that the user may more easily access and understand the intangible service.

Figure 3:
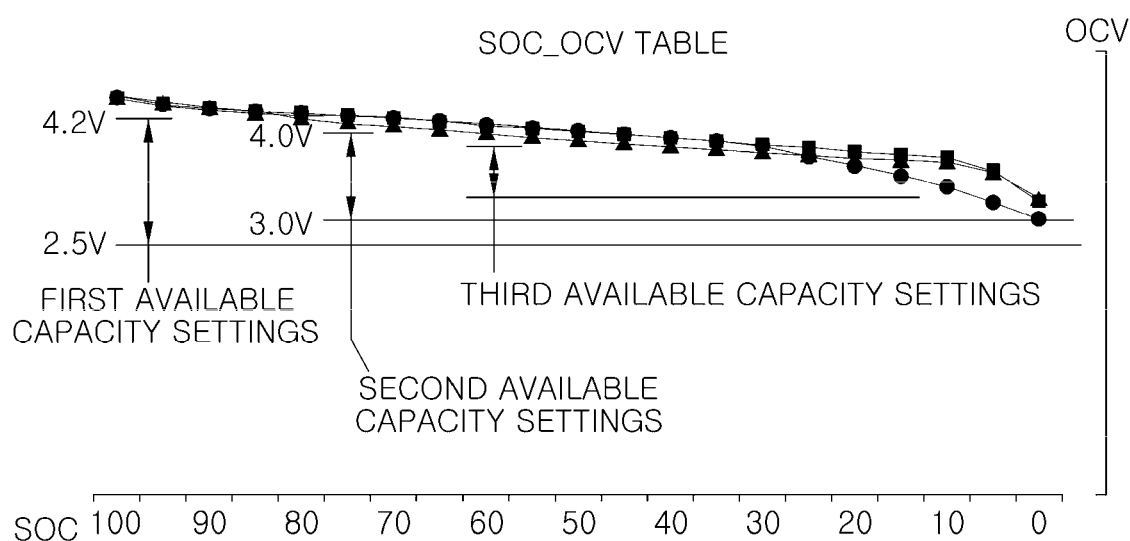
FIG. 3 is a view illustrating relations between the SOC of the battery and the open-circuit voltage of the battery so as to represent a further example of settings of the available capacity of the battery in the available capacity-based billing system for vehicle batteries according to one embodiment of the present disclosure.

FIG. 3 is a view illustrating relations between the SOC of the battery and the open-circuit voltage of the battery so as to represent a further example of settings of the available capacity of the battery in the available capacity-based billing system for vehicle batteries according to one embodiment of the present disclosure.

Instead of the method using the charge cut-off voltage and the discharge cut-off voltage in order to operate the battery 11 within the range of the available capacity which is set in advance, a method using a reference table in which relations between the SOC of the battery 11 and the open-circuit voltage of the battery 11 are stored in advance may be applied, as shown in FIG. 3.

The battery controller 12 may operate the battery 11 within the range between the open-circuit voltage of the battery 11 corresponding to the maximum value of the SOC of the battery 11 depending on the set available capacity and the open-circuit voltage of the battery 11 corresponding to the minimum value of the SOC of the battery 11 depending on the set available capacity, using the reference table shown in FIG. 3.

That is, the battery controller 12 may monitor the open-circuit voltage of the battery 11, and may stop charging of the battery 11 when the open-circuit voltage of the battery 11 reaches a voltage corresponding to the maximum value of the SOC of the battery 11 depending on the set available capacity, during charging of the battery 11. In the same manner, the battery controller 12 may monitor the open-circuit voltage of the battery 11, and may stop discharging of the battery 11 when the open-circuit voltage of the battery 11 reaches a voltage corresponding to the minimum value of the SOC of the battery 11 depending on the set available capacity, during discharging of the battery 11.

In a case in which an actual vehicle is operated, the vehicle may be in an inoperable state when the open-circuit voltage of the battery 11 becomes the discharge cut-off voltage or a voltage corresponding to the minimum value of the SOC of the battery 11, and thus, the battery controller 12 may output a discharge warning before the open-circuit voltage of the battery 11 reaches the discharge cut-off voltage or the voltage corresponding to the minimum value of the SOC of the battery 11.

In various embodiments of the present disclosure, the battery controller 12 may determine the maximum value and the minimum value of the SOC of the battery 11 as values symmetric to each other with respect to a reference value of the SOC of the battery 11. The available capacity of the battery 11 may be set to have the upper and lower limits of the SOC which are symmetric to each other with respect to the SOC value of 50% corresponding to the median SOC of the battery 11. Such a battery operating technique is known as a technique which may minimize deterioration of the battery 11 so as to increase the lifespan of the battery 11, and a used battery having excellent quality may be acquired through such battery operation and may thus promote activation of the battery industry belonging to downstream industries.

Here, the reference value of the SOC of the battery 11 may be set to 50%, or may be set variably to any value within the range of 50% to about 65% depending on a driving environment or the level of demanded output, and the maximum value and the minimum value of the SOC of the battery 11 may be set to values symmetric to each other with respect to the reference value.

Figure 4:
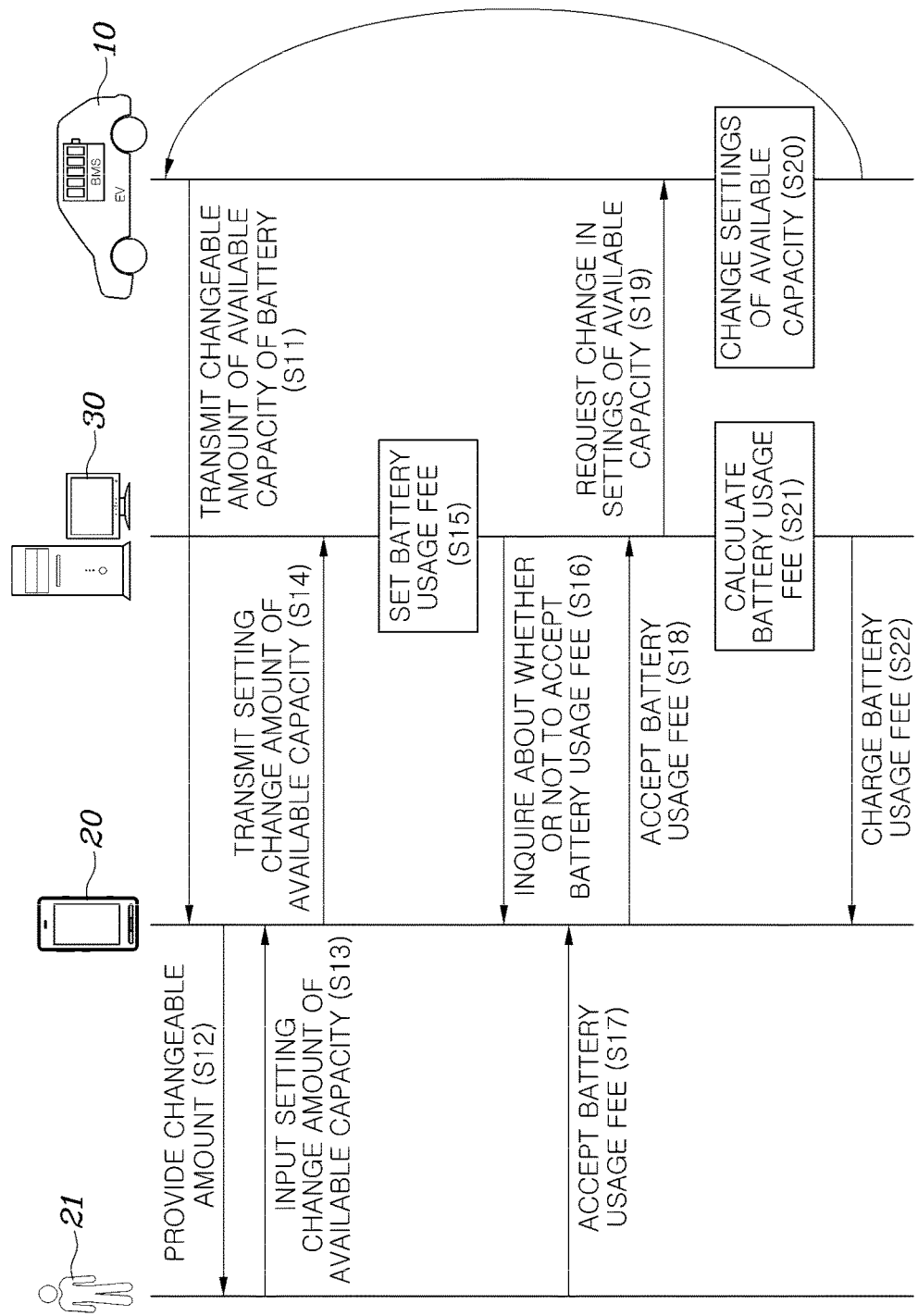
FIG. 4 is a view illustrating an available capacity-based billing method for vehicle batteries according to one embodiment of the present disclosure.

FIG. 4 is a view illustrating an available capacity-based billing method for vehicle batteries according to one embodiment of the present disclosure.

Referring to FIG. 4, the available capacity-based billing method for vehicle batteries according to one embodiment of the present disclosure includes determining a changeable amount of the available capacity of the battery 11 based on settings of the available capacity of the battery 11 predetermined by the vehicle 10, more particularly, the battery controller 12 in the vehicle 10, and transmitting the determined changeable amount to the user terminal 20 at S11.

Thereafter, the user terminal 20 may display the received changeable amount of the available capacity of the battery 11 so as to provide the received changeable amount of the available capacity to a user 21 at S12, and the user 21 may input a capacity setting change request including a setting change amount of the available capacity of the battery 11 to the user terminal 20 with reference to the displayed changeable amount of the available capacity of the battery 11 upon determining that a change in the available capacity of the battery is necessary at S13.

Thereafter, the user terminal 20 may transmit the received capacity setting change request including the setting change amount of the available capacity of the battery 11 to the server 30 at S14, and the server 30 may receive the capacity setting change request, may confirm the setting change amount of the available capacity of the battery 11 included in the capacity setting change request, and may set a battery usage fee corresponding to the setting change amount of the available capacity of the battery 11 at 515.

Thereafter, the server 30 may transmit the usage fee corresponding to the setting change amount of the available capacity of the battery 11 to the user terminal 20 at S16, and the user terminal 20 may receive whether or not to accept the battery usage fee corresponding to the setting change amount of the available capacity from the user 21 at S17, and may transmit a user determination as to whether or not to accept the battery usage fee to the server at S18.

Thereafter, when the user 21 accepts the battery usage fee corresponding to the setting change amount of the available capacity, the server 30 may transmit a request for changing the settings of the available capacity of the battery 11 so as to correspond to the setting change amount of the available capacity demanded by the user 21 to the vehicle 10 at S19, and the battery controller 12 of the vehicle 10 may control the battery 10 to change the available capacity of the battery 10 at S20.

In the change in the available capacity of the battery 10 at S20, a charge cut-off voltage corresponding to the maximum value of the SOC of the battery 11 depending on a newly set available capacity of the battery 10 may be newly set, and a discharge cut-off voltage corresponding to the minimum value of the SOC of the battery 11 may be newly set.

As another example, in the change in the available capacity of the battery 10 at S20, the maximum value of the open-circuit voltage of the battery 11 corresponding to the maximum value of the SOC of the battery 11 depending on a newly set available capacity of the battery 10 may be newly set, and the minimum value of the open-circuit voltage of the battery 11 corresponding to the minimum value of the SOC of the battery 11 may be newly set.

In addition, the server 30 may calculate and charge the battery usage fee based on the settings of the available capacity of the battery 11 and the usage period of the corresponding settings of the available capacity at S21 and S22.

As described above, an available capacity-based billing system and method for vehicle batteries according to several embodiments of the present disclosure enable the available capacity of a battery installed in an electric vehicle to be changed so as to suit customer needs and charge a usage fee based on the available capacity, thereby being capable of providing economic benefits to a customer using a small available capacity of the battery.

Further, the available capacity-based billing system and method for vehicle batteries according to several embodiments of the present disclosure set the upper and lower limits of the available capacity of the battery to values vertically symmetric to each other with respect to the reference value of the SOC of the battery so as to reduce degradation of the battery and to increase the lifespan of the battery, thereby being capable of providing a used battery having excellent quality in terms of the battery industry belonging to downstream industries.

In addition, the available capacity-based billing system and method for vehicle batteries according to several embodiments of the present disclosure may prepare various fee systems depending on the available capacities of the battery of the vehicle and the usage periods of the corresponding available capacities, as in fee systems of a wireless communication service, and may create additional profits through various related products or the like.

As is apparent from the above description, an available capacity-based billing system and method for vehicle batteries according to one embodiment of the present disclosure enable the available capacity of a battery installed in an electric vehicle to be changed so as to suit customer needs and charge a usage fee based on the available capacity, thereby being capable of providing economic benefits to a customer using a small available capacity of the battery.

Further, the available capacity-based billing system and method for vehicle batteries according to one embodiment of the present disclosure set the upper and lower limits of the available capacity of the battery to values vertically symmetric to each other with respect to the reference value (for example, 50%) of the SOC of the battery so as to reduce degradation of the battery and to increase the lifespan of the battery, thereby being capable of providing a used battery having excellent quality in terms of the battery industry belonging to downstream industries.

In addition, the available capacity-based billing system and method for vehicle batteries according to one embodiment of the present disclosure may prepare various fee systems depending on the available capacities of the battery of the vehicle and the usage periods of the corresponding available capacities, as in fee systems of a wireless communication service, and may create additional profits through various related products or the like.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. An available capacity-based billing system for vehicle batteries, comprising:
   a vehicle comprising a battery, and a battery controller configured to determine a maximum value and a minimum value of a state of charge (SOC) of the battery based on settings of an available capacity of the battery;
   a user terminal configured to receive a capacity setting change request comprising a setting change amount of the available capacity, and then to transmit the capacity setting change request; and
   a server configured to receive the capacity setting change request transmitted by the user terminal, and to determine a battery usage fee corresponding to the setting change amount of the available capacity comprised in the received capacity setting change request.

2. The available capacity-based billing system according to claim 1, wherein the battery controller is configured to determine a changeable amount of the available capacity of the battery based on predetermined settings of the available capacity of the battery, and to transmit the determined changeable amount to the user terminal.

3. The available capacity-based billing system according to claim 2, wherein the user terminal displays the changeable amount, and receives the setting change amount of the available capacity determined based on the changeable amount.

4. The available capacity-based billing system according to claim 1, wherein:
   the server transmits the battery usage fee corresponding to the setting change amount of the available capacity to the user terminal; and
   the user terminal receives instructions whether or not to accept the battery usage fee corresponding to the setting change amount of the available capacity, and transmits the instructions whether or not to accept the battery usage fee to the server.

5. The available capacity-based billing system according to claim 1, wherein the server calculates and charges the battery usage fee based on the settings of the available capacity of the battery and a usage period of the corresponding settings of the available capacity.

6. The available capacity-based billing system according to claim 1, wherein the battery controller sets a charge cut-off voltage corresponding to the maximum value of the SOC of the battery depending on the settings of the available capacity, and sets a discharge cut-off voltage corresponding to the minimum value of the SOC of the battery depending on the settings of the available capacity.

7. The available capacity-based billing system according to claim 1, wherein the battery controller sets a maximum value of an open-circuit voltage of the battery corresponding to the maximum value of the SOC of the battery depending on the settings of the available capacity, and sets a minimum value of the open-circuit voltage of the battery corresponding to the minimum value of the SOC of the battery depending on the settings of the available capacity.

8. The available capacity-based billing system according to claim 1, wherein the battery controller determines the maximum value and the minimum value of the SOC of the battery as values symmetric to each other with respect to a reference value of the SOC of the battery.

9. An available capacity-based billing method for vehicle batteries using an available capacity-based billing system, the available capacity-based billing method comprising:
- receiving, by a user terminal, a capacity setting change request comprising a setting change amount of the available capacity, and then transmitting the capacity setting change request;
- receiving, by a server, the capacity setting change request transmitted by the user terminal and determining a battery usage fee corresponding to the setting change amount of the available capacity comprised in the received capacity setting change request; and
- transmitting, by the server, the setting change amount of the available capacity to the vehicle after determining the battery usage fee, and changing, by a battery controller, settings of the available capacity of the battery.

10. The available capacity-based billing method according to claim 9, further comprising determining, by the battery controller, a changeable amount of the available capacity of the battery based on predetermined settings of the available capacity of the battery, and transmitting the determined changeable amount to the user terminal, before the transmitting, by the user terminal, the capacity setting change request.

11. The available capacity-based billing method according to claim 10, wherein, in the receiving the capacity setting change request comprising the setting change amount of the available capacity and then transmitting the capacity setting change request, the user terminal displays the changeable amount, and receives the setting change amount of the available capacity determined based on the changeable amount.

12. The available capacity-based billing method according to claim 9, wherein the determining the battery usage fee comprises:
- transmitting, by the server, the battery usage fee corresponding to the setting change amount of the available capacity to the user terminal; and
- receiving, by the user terminal, whether or not to accept the battery usage fee corresponding to the setting change amount of the available capacity and transmitting whether or not to accept the battery usage fee to the server.

13. The available capacity-based billing method according to claim 9, further comprising calculating and charging, by the server, the battery usage fee based on the settings of the available capacity of the battery and a usage period of the corresponding settings of the available capacity.

14. The available capacity-based billing method according to claim 9, wherein, in the changing the settings of the available capacity of the battery, the battery controller sets a charge cut-off voltage corresponding to the maximum value of a SOC of the battery depending on the settings of the available capacity, and sets a discharge cut-off voltage corresponding to the minimum value of the SOC of the battery depending on the settings of the available capacity.

15. The available capacity-based billing method according to claim 9, wherein, in the changing the settings of the available capacity of the battery, the battery controller sets a maximum value of an open-circuit voltage of the battery corresponding to the maximum value of the SOC of the battery depending on the settings of the available capacity, and sets a minimum value of the open-circuit voltage of the battery corresponding to the minimum value of the SOC of the battery depending on the settings of the available capacity.

16. The available capacity-based billing method according to claim 9, wherein, in the changing the settings of the available capacity of the battery, the battery controller determines the maximum value and the minimum value of the SOC of the battery as values symmetric to each other with respect to a reference value of the SOC of the battery.

* * * * *